United States Patent [19]

Edling et al.

[11] Patent Number: 4,489,269

[45] Date of Patent: Dec. 18, 1984

[54] ATOMIC BATTERY WITH BEAM SWITCHING

[76] Inventors: Ellsworth A. Edling, 2910 NE. 11th Ter., Pompano Beach, Fla. 33064; Richard P. McKenna, 122 Duvall La., Apt. 301, Gaithersburg, Md. 20877; Frederick D. Trexler, Hillside Dr., Houghton, N.Y. 14744; E. Thomas Peterick, Jr., 310 NW. 37th St., Pompano Beach, Fla. 33064

[21] Appl. No.: 445,980

[22] Filed: Dec. 1, 1982

[51] Int. Cl.³ .......................... H02M 1/02; G21H 1/00

[52] U.S. Cl. ...................................... 322/2 R; 363/121; 376/320

[58] Field of Search ................ 322/2 R; 363/120-122; 376/320, 321; 328/227; 315/3, 5

[56] References Cited

U.S. PATENT DOCUMENTS

| | | | |
|---|---|---|---|
| 2,333,593 | 11/1943 | Slepian | 363/122 |
| 3,021,472 | 2/1962 | Hernovist | 322/2 |
| 3,178,631 | 4/1965 | Sweet | 322/2 |
| 3,302,095 | 1/1967 | Bell et al. | 363/121 |

*Primary Examiner*—R. J. Hickey
*Attorney, Agent, or Firm*—Oltman and Flynn

[57] ABSTRACT

An electric power generating apparatus that is powered primarily by the emission of electrically charged particles from radio-active materials enclosed in an evacuated vessel of glass or the like. An arrangement of reflecting electrodes causes a beam of particles to switch back and forth at a high frequency between two collecting electrodes that are connected to a resonating tuned primary circuit consisting of an inductor with resonating capacitor. The reflecting electrodes are energized in the proper phase relationship to the collecting electrodes to insure sustained oscillation by means of a secondary winding coupled inductively to the primary winding and connected to the reflecting electrodes. Power may be drawn from the circuit at a stepped down voltage from a power take-off winding that is coupled to the primary winding. The disclosure also describes a collecting electrode arrangement consisting of multiple spatially separated electrodes which together serve to capture a maximum of the available particle energy. A self-starting arrangement for start of oscillations is described. A specially adapted version of the invention utilizes two complementary beams of oppositely charged particles which are switched alternatingly between the collecting electrodes.

11 Claims, 11 Drawing Figures

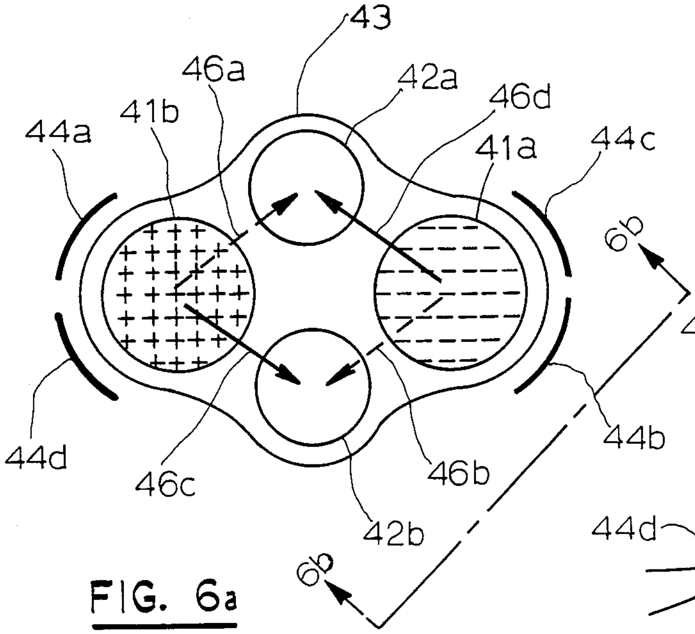
FIG. 6a
FIG. 6b
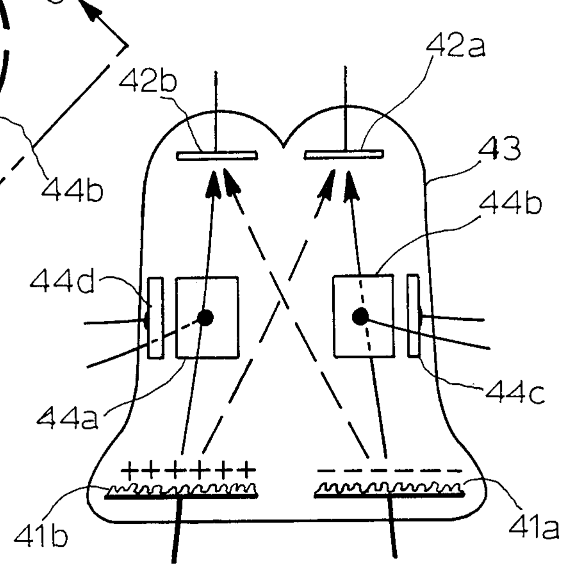
FIG. 7
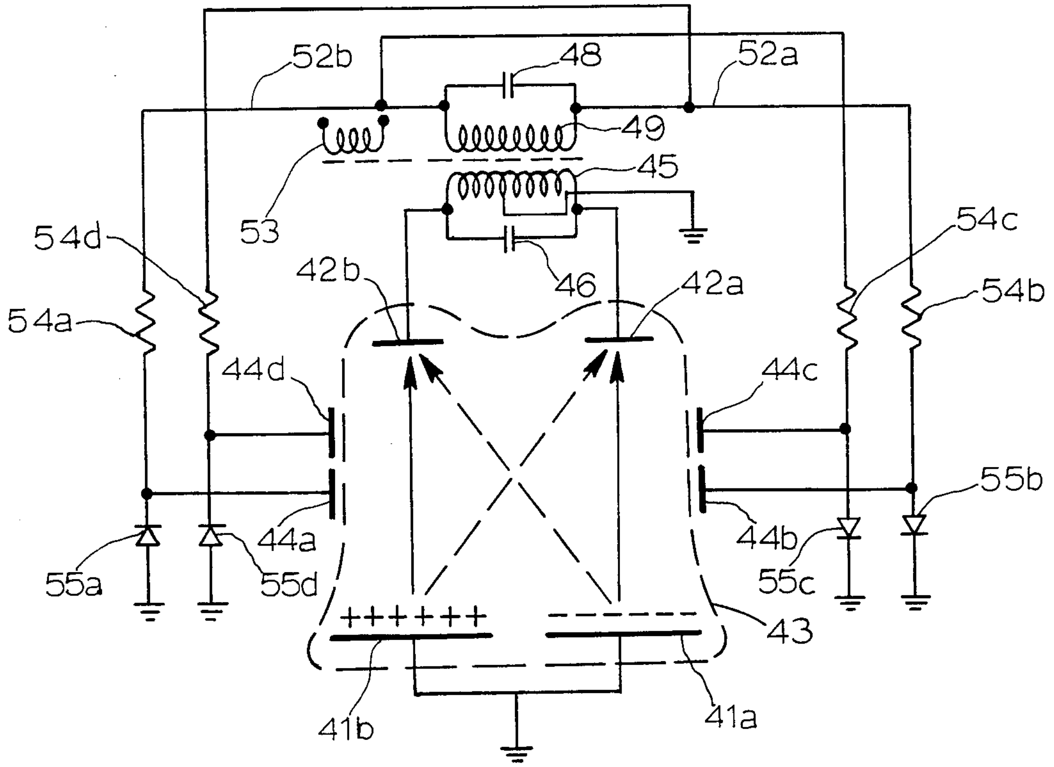

ATOMIC BATTERY WITH BEAM SWITCHING

BACKGROUND AND PRIOR ART

The present invention is related to devices that generate electric power from the radiation of electronically charged particles. Particles of this type are known as beta particles that are negatively or positively charged. Beta particles, as is well known, have a very small but finite mass and travel at very high velocities and therefore do possess a measure of kinetic energy, which, according to the laws of physics is equal to the mass multiplied to the velocity squared.

Electrons are emitted from various sources and especially from the surface of certain very hot metals such as cesium and from radio-active elements such as radium, plutonium, thorium, uranium and from many isotopes of normally not radioactive elements.

Some examples of particle-emitting sources are Promethium-147 (chemical sign Pm-147) where the Figure 147 designates a heavy isotope with nucleous weight of 147. This material emits negative beta particles with an energy corresponding to 0.23 mega volts. Thallium-204 (Tl-204) is another source of negative beta particles, having an energy corresponding to 0.765 mega volts. A source of positive beta particles is Sodium-22 (Na-22), which emits particles at an energy level of 0.54 mega volts.

The above energy sources spend their energy such that the active material is spent approximately within a time frame of 2 to 3 years, which represents the so-called half-life of the material.

Inventors have in the past sought to construct electronic power generating apparatus based on the radiation of electrically charged particles.

U.S. Pat. No. 3,021,472 by K. G. Hernqvist issued Feb. 13, 1962 describes a thermionic energy converter in which a heated cathode emits electrons that are intercepted by a collecting electrode.

U.S. Pat. No. 3,178,631 by D. H. Sweet, issued Apr. 13,1965 describes electric power generating apparatus containing an internal core of radio-active material surrounded by collectors which collect the electrons emitted from the radio-active material. The electric energy received by the collectors is in nature of a very high voltage and of a very low amperage, and is direct currect (DC). Such energy is difficult to convert to more useable type energy of lower voltage and higher current, due to the fact that it is of direct current (DC) nature, and must therefore first be converted to alternating current (AC) before it can be converted in a transformer to energy of lower voltage and higher current. Referenced patent by D. H. Sweet proposes a method of conversion consisting of beam switching tubes in which reflecting electrodes switch a beam of electrons from a hot cathode back and forth between two collecting electrodes that are in turn connected to a primary winding of a transformer, the secondary winding of which produces alternating current of stepped-down voltage. Referenced patent however, suffers from the drawback that the additional apparatus required for the energy conversion leads to increased complexity and cost as well as energy loss and reduced reliability.

The present invention avoids these problems by means of a beam switching arrangement that is performed directly in the vessel containing the radio-active material and by switching directly the beams of particles emitted by the radio-active material by means of external reflecting electrodes that are interacting with the collecting electrodes, as is described in greater detail in the following description and the appended drawings.

It is therefore a primary object of the present invention to provide apparatus for generating electronic energy from radioactive materials which converts directly the kinetic energy of the charged particles to electric energy by switching the particle beam between the collecting electrodes.

It is a further object of the invention to provide apparatus for collecting a maximum amount of the available particle energy by means of a stepped system of collecting electrodes that are disposed at increasing distances from the particle emitting material.

It is a further object of the invention to provide apparatus that yields a high degree of efficiency by converting the DC-current produced by the particle beam directly into AC-current which can be readily converted to lower voltage in a transformer connected to the collecting electrodes.

It is still another object of the invention to perform the beam-switching operation by means of AC-voltage derived directly from the aforesaid transformer without intervening switching apparatus.

It is still another object of the invention to provide apparatus for generating electric energy from a radioactive particle source that is simple and reliable in construction and that is capable of production without undue complexity.

Other advantages and objects of the invention will become clear in the course of the following description.

Figure 6:
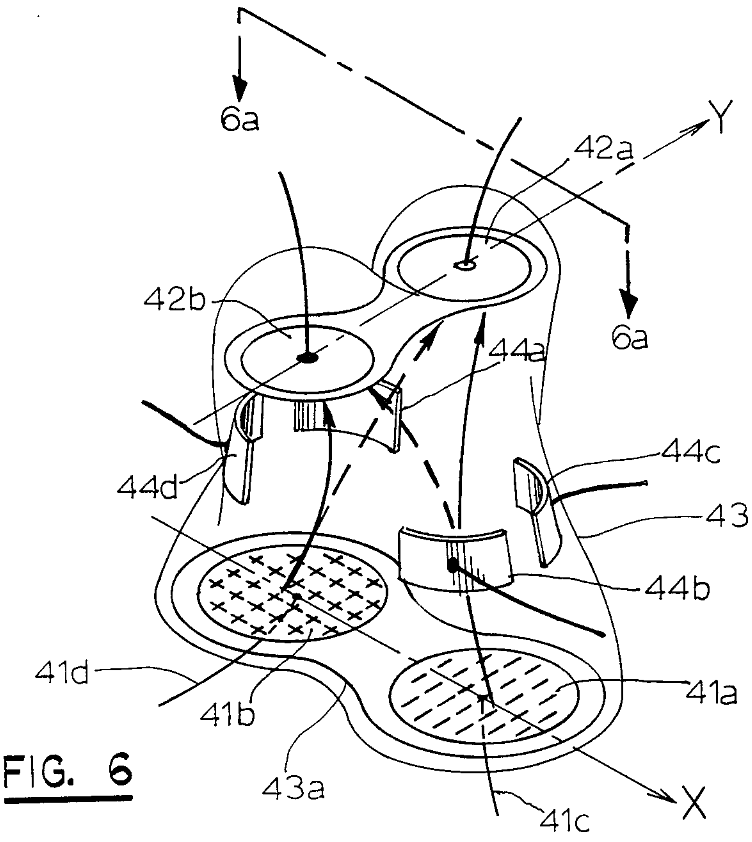
FIG. 6 is a perspective diagrammatic view of the invention arranged for two sets oppositely charged particle beams.
Figure 8:
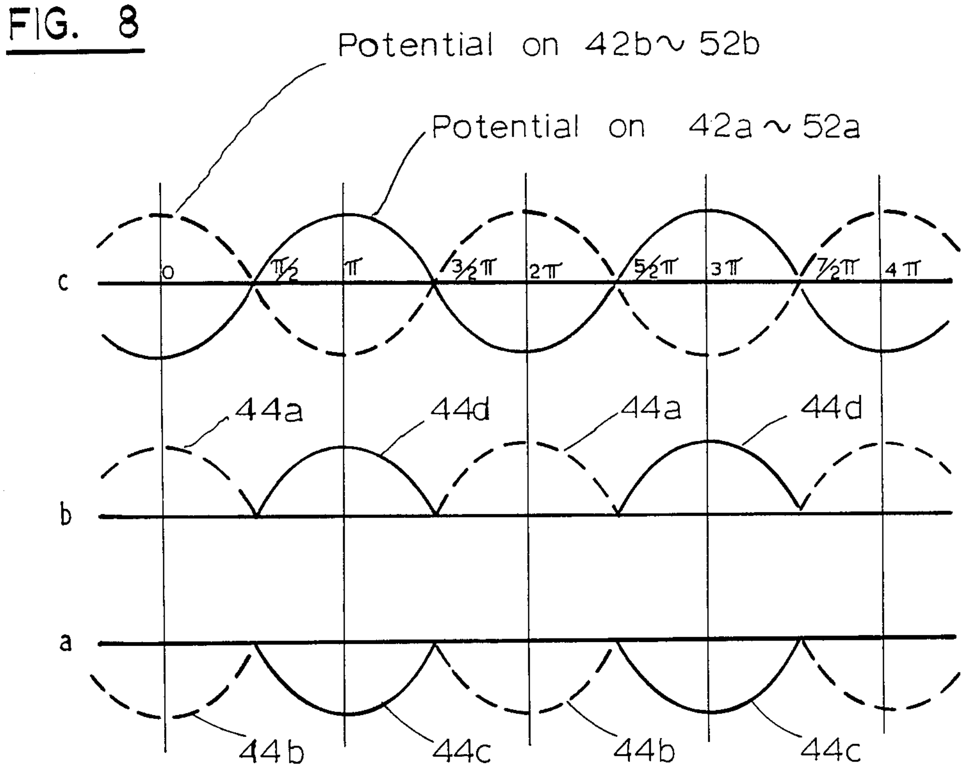
Figure 9:
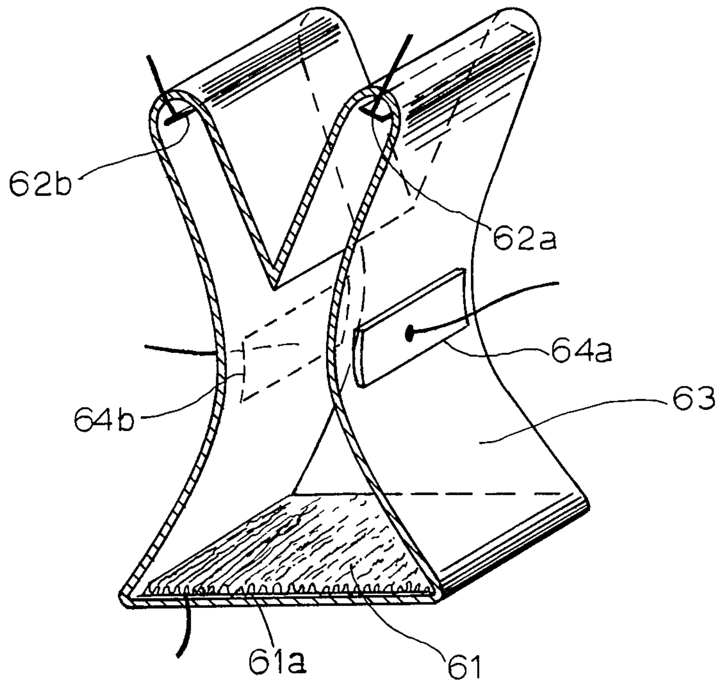

FIGS. *6a* and *6b* are horizontal and vertical views respectively of the embodiment of FIG. 6 showing details of the beam switching arrangement;

FIG. 7 is a schematic circuit diagram of the embodiment at FIG. 6 showing details of the electrical circuit;

FIG. 8 shows the electrical potentials at various points of FIG. 7 as a function of time;

FIG. 9 is a perspective view of an embodiment having an elongated construction;

DETAILED DESCRIPTION

Charged particles as they are emitted from radio-active materials possess kinetic energy that may be converted to electrical energy by means of suitably constructed apparatus as described in the present specification with appended drawings. Radio-active materials expend their energy with a gradually declining intensity, generally described by their so-called half-life. The half-life of radio-active materials varies greatly from a small fraction of a second to thousands of years. It follows that generally the shorter the half-life of a material the more energetic is the particle radiation. Many materials with half-lives of a few years generate enough energy in the form of radiated charged particles that they may serve as a source of energy in places where a constant, highly reliable and safe energy source is required.

Great masses of radio-active material are presently produced in the form of radio-active waste in the nation's nuclear power generators and much of this material may serve as the radioactive particle-emitting source in the atomic battery according to the present invention.

The electrically charged beta particles emitted by radio-active materials are emitted from the surface of the materials at different velocities according to the laws of random distribution. The particles of lower velocity represent a lower electrical potential than that of the particles of higher velocity. In order to attain a power conversion of acceptable efficiency, it is desirable to collect nearly all the emitted particles. This is done in one embodiment of the present invention by means of an arrangement of spatially disposed collecting electrodes which are connected to potentials corresponding to taps on the transformer primary winding as explained in the following.

In one embodiment of the invention, complementary beams of positive and negative beta particles are switched within the envelope of the same vessel by means of a uniquely arranged system of reflecting and collecting electrodes disposed so that the two oppositely charged beams never interfere with each other.

In the following description of a number of preferred embodiments of the invention, the terminology used is for description and not for limitation. It should further be understood that the invention is capable of other embodiments that may be obvious to those skilled in the art.

The invention is described in relation to the figures such that the radio-active material is positioned in the bottom part of the vessel, but it should be understood that the physical orientation is immaterial for the operation of the invention.

Figure 1:
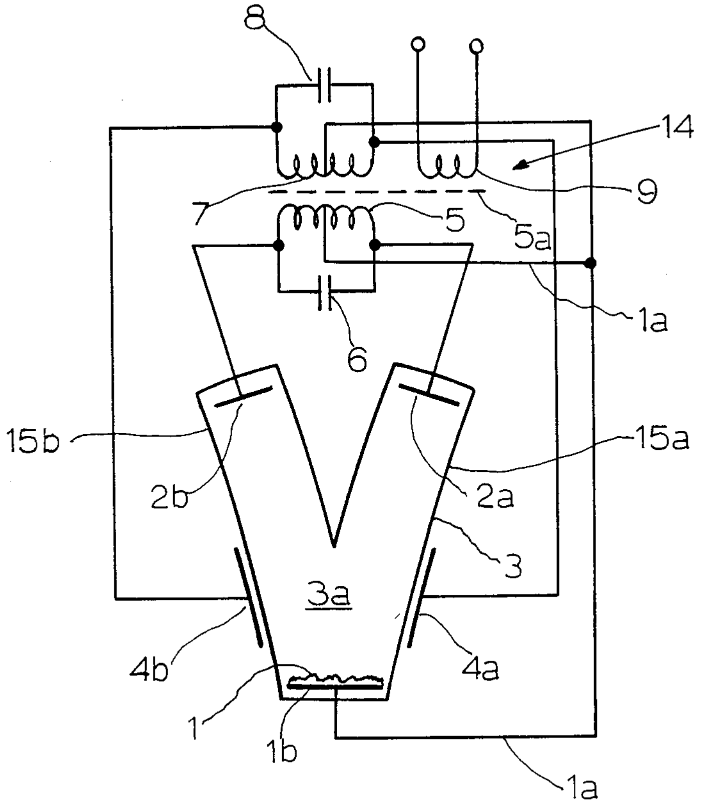
FIG. 1 is a schematic circuit diagram of the invention in its most basic form consisting of a vessel containing the radio-active particle source, two collecting electrodes connected to the primary winding of a transformer and a secondary winding steering two reflecting electrodes and a power take-off winding.

FIG. 1 shows the invention in its most basic form. 3 is a vessel, preferably made of an electrically insulating airtight material, such as glass, ceramic or the like.

The walls of the vessel define an inner cavity, having a lower cavity section, generally at *3a* and two upper branch cavity sections 15*a* and 15*b* respectively.

The bottom section of the vessel contains a radio-active material that emits beta particles in a suitable amount for the power drain required. The vessel is upwardly bifurcated into the two branches 15*a* and 15*b*.

The upper end of each branch contains a collecting electrode 2*a* and 2*b* respectively.

The radio-active material 1 is deposited on a metallic electrode 1*b* which is connected to an electrical conductor 1*a* which exits through an air-tight seal at the bottom wall of the vessel. The inner cavity is generally evacuated and contains only minute traces of any gas.

The two collecting electrodes 2*a* and 2*b* are connected to the terminals of a resonant circuit consisting of inductor 5 and resonating capacitor 6. The resonant circuit is tuned to a high frequency that is so high that the parallel resonant circuit has a very high impedance. The inductor may contain an iron core 5*a* consisting of thin laminations or of a suitable iron powder. The impedance of the resonant circuit should be greater by an order of magnitude than the DC-impedance of the entire DC-circuits, as expressed by the ratio of the root-mean-square of the voltage on one of the electrodes 15*a* or *b* to the DC-current flowing in conductor 1*a*.

The inductor 5 forms the primary winding of a transformer generally at 14, having secondary windings 7 and 9. The winding 7 is tuned to generally the same frequency as the primary resonant circuit 5 and 6. The terminals of the circuit are connected to two reflector plates 4*a* and 4*b* respectively.

The secondary resonant circuit 7, 8 is connected to the deflector plates 4*a* and 4*b* such that the AC-potential on plates 4*a* and 4*b* are in phase with the collector terminals 2*a* and 2*b* respectively.

A take-off secondary winding 9 serves as a power take-off winding. This winding may have a turns ratio to the primary winding 5 such that an output potential of a desirable magnitude is attained.

Depending upon a number of the parameters of the apparatus of FIG. 1, it may be capable of starting the beam switching operation by itself. Assuming that to be the case the operation starts as follows:

A volume of beta particles are emitted from the radio-active material 1. A part of the particles attach themselves to the inside walls of the vessel which are then negatively charged and repel the ensuing particles emitted by the material 1. The ensuing particles therefore form two beams of particles that travel upward through the two branches 15*a* and 15*b* where they hit the two collecting electrodes 2*a* and 2*b*, causing an electric current of negative particles from each end of the inductor 5 to flow to its center terminal and through the conductor 1*a* back to the electrode 1*b* which is attached to the radio-active material 1.

Assuming, as said above, that the system is capable of self-starting, any minute transient difference in the current through the two branches 15*a* and 15*b* and through the two half parts of the winding 5 will be coupled inductively to the winding 7 and transmitted as a potential difference to the two reflector plates 4*a* and 4*b*. Since the terminals of winding 7 are in the same phase as the terminals of winding 5, it follows that if collector electrode 2*b*, due to the aforesaid minute difference, becomes slightly more negative than the electrode 2*a* as a result the reflector plate 4*b* becomes also slightly more negative. Since the negative potential repels the beam in branch 15*b*, which as said above consists of negative beta particles, part of the beam will be displaced to the other branch 15*a*, which then causes the electrode 2*a* to become more negative, which then in turn causes the reflector plate 4*a* to push the beam back into the first branch 15*b*, and so forth, until the entire beam of beta particles switches back and forth between the two branches 15*a* and 15*b* at a frequency determined by the resonant primary circuit 5 and 6. This operating condition constitutes the normal operation of the system, in which a small amount of energy is drawn from the transformer by the secondary winding 5 to sustain the operation of the system, while the greater part of the energy produced by the emitted beta particles may be drawn off by the take-off winding 9 to be dissipated in a load connected thereto but not shown.

It follows that the energy drawn from the system is in the form of high frequency AC energy, which may be rectified into DC energy and converted back to some other frequency, depending on the requirements of the load circuit.

Figure 2:
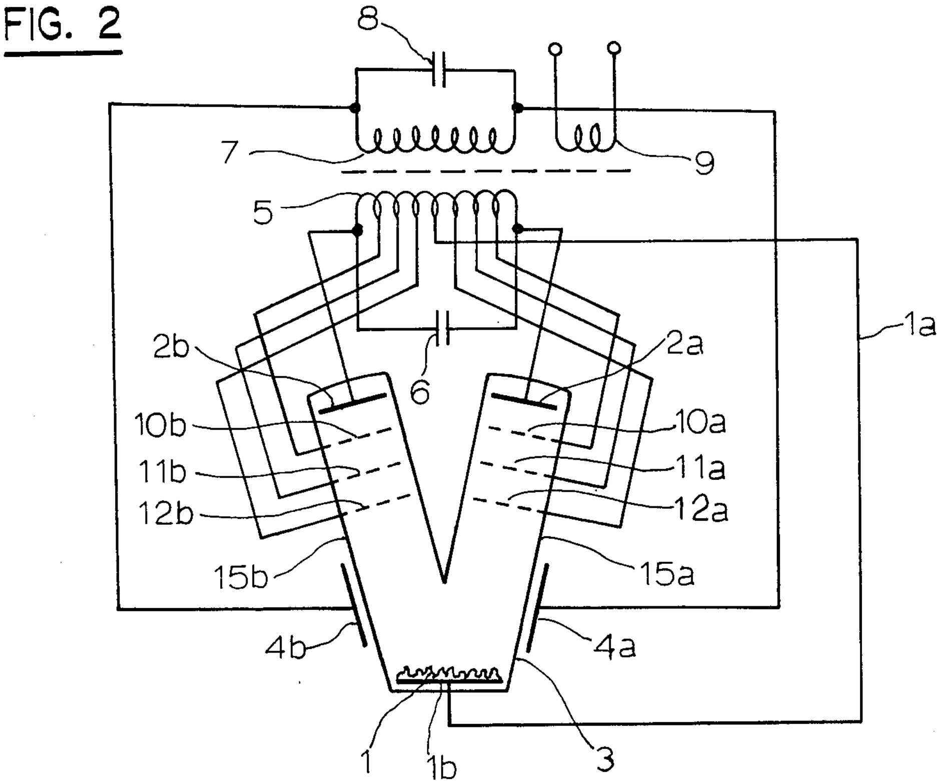
FIG. 2 is a schematic diagram of the invention in which the stepped collecting electrodes are connected to taps on the transformer primary winding.

FIG. 2 shows an improved embodiment of the invention. Here, the two branches 15*a* and 15*b* contain a plurality of collecting electrodes in addition to above described electrodes 2*a* and 2*b*. These additional electrodes are shown as 10*a*, 11*a* and 12*a* in branch 15*a* and 10*b*, 11*b* and 12*b* in branch 15*b*. The plurality of electrodes is shown as three, but may be any other suitable plurality. Each of these additional electrodes consists typically of a fine grid of metal wire which is capable of collecting those beta particles which have a velocity that is generally just sufficient to reach that particular electrode. Slower particles will be collected by an electrode positioned at a lower level or fall back onto the particle emitting electrode 1*b*. The faster particles will travel through the grid and be collected by a higher level electrode.

Each of the collecting electrodes is connected to a tap in the primary winding 5, which in this embodiment is equipped with a number of taps connected to each half part of the winding 5.

In its normal operating condition, each of the collecting electrodes will represent an electric potential in volts which corresponds to the distance that the electrode is placed above the emitting electrode 1*b*, and which in turn corresponds to the velocity of the beta particles that are collected by that electrode, as explained above. In the same manner, each tap on the winding 5 represents an impedance which is a certain fraction (fz) of the entire impedance z between an end terminal and the center tap of the coil 5, and where fz is chosen so that it matches the output impedance of each collecting electrode.

By this means each collecting electrode is connected to a point of matching impedance on the winding 5, and as is well known from the field of electrical science, such matching results in the most ideal condition for energy transfer from all the collecting electrodes to the resonant circuit 5,6.

Figure 3:
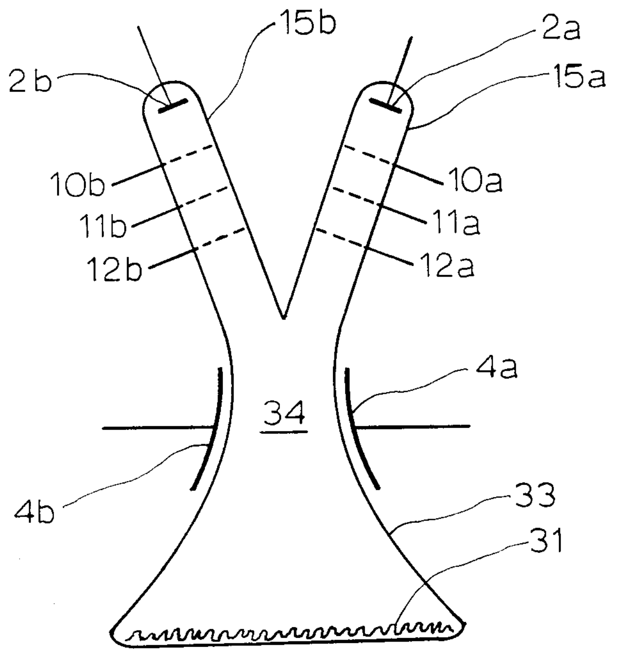
FIG. 3 is a diagrammatic elevational view of a vessel having a flared undersection that is capable of containing a larger amount of radio-active material.

In still another embodiment, shown in FIG. 3, the lower part of the vessel has been enlarged so that it may contain a larger surface of beta particle emitting material 31, thereby affording a greater amount of emitted particle energy. Since the inner surfaces of the walls of the vessel is coated with beta particles that cling to the walls, the lower part of the vessel functions as an inverted funnel that funnels the upward moving stream of beta particles through the neck area of the vessel shown generally at 34. The two reflecting plates 4*a* and 4*b* are in this embodiment, disposed generally at the level of the neck area.

In order to further increase the amount of energy generated by the radio-active material 31, it is possible to enhance its surface area by suitable treatment, such as plasma etching or other known methods of surface treatment.

Figure 4:
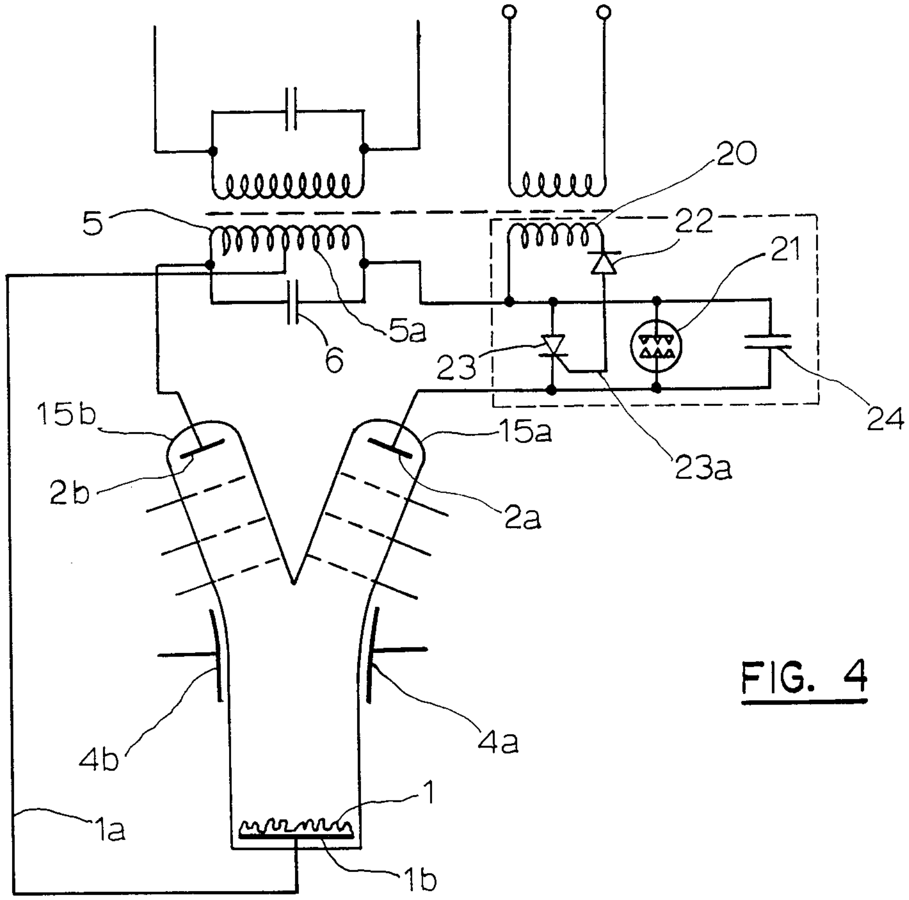
FIG. 4 is a schematic circuit diagram of the invention showing elements for self-starting of the beam switching process.

In the construction of an atomic battery, according to the present invention, it may be desirable or necessary to provide means that enable the system to start its operation if the system parameters are such that it is incapable of self starting. Such a starting arrangement is shown in FIG. 4.

The self-starting arrangement operates as follows: Assuming the system is in its quiescent state with no beam switching taking place, the radio-active material 1 emits a steady stream of beta particles which move upward inside the vessel and in the quiscent state divides into two generally equal streams through the two branches 15*a* and 15*b* and reach the collecting electrodes as described above. In this state all collecting electrodes except the electrode 2*a* remain at ground potential, because the charges from the collected beta particles leak off and return to the emitter electrode 1*b*, due to the low metallic dc-resistance of the winding 5 and the return conductor 1*a*. The collecting electrode 2*a* however is not at this time connected directly to the end of the winding 5, but is connected thereto through a thyristor 23. A thyristor is, as is well known from the fields of electrical science and semi-conductors, a component which when not triggered "on" exhibits a very high impedance in its forward direction, which in this case is the direction from the winding 5 through the thyristor 23 to the collecting electrode 2*a*, as long as no current is flowing through the device, or as long as the control electrode 23*a* has not been activated "triggered". The control electrode may be activated by drawing a very small amount of current through the control electrode in the direction away from the thyristor.

With the system in its quiescent state, with no beam switching taking place, a negative potential gradually builds up on the collecting electrode 2*a* as a result of the accumulating electrical charges from the beta particles hitting that electrode. This charge may typically reach several thousand volts if there is no leakage path through which the charge may escape, which will be the case in this operating state. A spark gap 21 is disposed in parallel connection with the thyristor 23. The spark gap is an electrical component that admits no current until a certain breakdown voltage has been reached across the gap. When the breakdown voltage is reached the air in the gap is suddenly ionized by the voltage gradient in the gap and becomes conductive, and in fact, it becomes conductive exhibiting a very low resistance to the current. As a result there is a sudden rush of current as the negative charge stored on the collecting electrode 2*a* is rapidly discharging its stored charge through the right hand half winding 5*a* of the winding 5, and returns to the emitter electrode 1*b*. This sudden rush of current through the half winding 5*a* sets the entire resonant circuit 5, 6 into a damped oscillation at the resonant frequency of the circuit. The damped oscillation starts the beam switching operation which, from this point in time, sustains itself as described above. An optional capacitor 24 which is also charged to a potential equal to that of the collecting electrode 2*a*, is beneficial to the start of the system by providing additional discharge current through the spark gap, which serves to ionize the air in the spark gap more intensively.

As soon as the damped oscillation is started, by the discharge of the stored energy through the spark gap, the start winding 20 picks up a small part of the oscillatory energy, which is rectified into half waves through the diode 22 to provide sustained trigger current to the control electrode 23*a* so that the thyristor 23 is triggered into its conducting state and maintained therein as the beam switching operation becomes self sustaining.

It should be noted that the starting circuit as described may be configured in a number of different ways, and that the components described therein may be different from those described. As examples, the thyristor may be a silicon controlled rectifier, the spark gap may be a gas-filled discharge tube of a type used commonly for lightning protection systems, or it may be a solid-state component of the so-called four-layer diode type which has characteristics similar to those of a spark gap.

Figure 5:
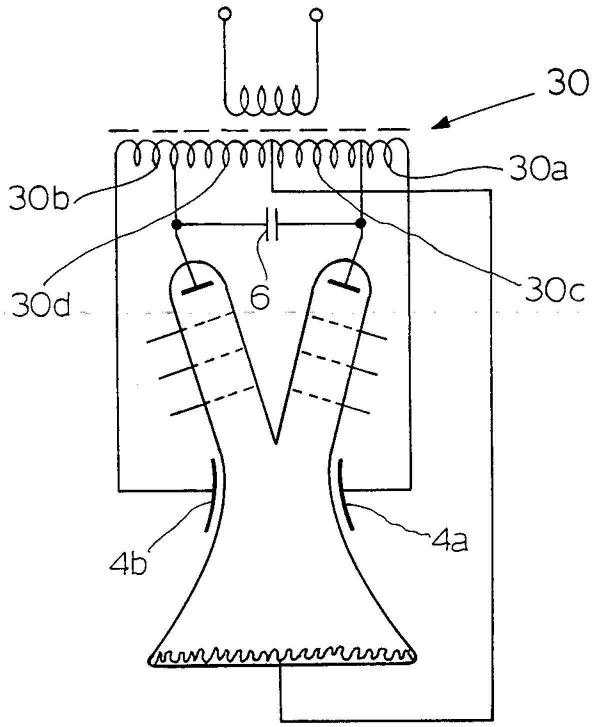
FIG. 5 is a schematic circuit diagram of the invention showing a transformer with a stepped primary transformer winding.

Another embodiment of the invention is shown in FIG. 5 in which the primary winding of the previously described resonant circuit 5, 6 (FIGS. 1, 2 and 4) has been configured as a socalled auto-transformer, thereby eliminating the secondary resonant circuit 7, 8 and incorporating it into a single primary resonant circuit where the primary winding 30 now consists of separate winding sections, shown as 30*a*, 30*b*, 30*c* and 30*d*. The winding sections 30*a* and 30*b* are extensions of the original winding 5, now designated 30*c* and 30*d* with the resonating capacitor 6 in parallel connection therewith. The extended winding sections 30*a* and 30*b* serve to steer the two reflecting plates 4*a* and 4*b* in the proper phase relationship to the collecting electrodes, which, as explained above, control the beam switching operation.

Still another embodiment of the invention is shown in FIGS. 6, 6*a*, 6*b* and 7.

This embodiment utilizes the fact that there are available, besides the negatively charged beta particle also the positively charged beta particle.

The availability of two oppositely charged particles makes it possible to construct an atomic battery with beam switching where two complementary beams are steered by suitably positioned reflecting plates to alternately hit two spatially separated collecting electrodes.

It is well known from the science of nuclear physics and chemistry and explained earlier in this specification, that some radio-active isotopes emit a preponderance of negative beta particles while others emit a preponderance of positive beta particles.

It follows that a beam of positive beta particles being positively charged will be repelled by a reflecting plate with a positive potential and attracted by a reflecting plate of a negative potential.

In FIG. 6, which shows an atomic battery according to the present invention, an enclosure or vessel 43, has disposed at its bottom surface 43*a* two spatially separated emitter electrodes 41*a* and 41*b*, where the electrode 41*a* is covered with a radio-active negative beta particle emitting material and the electrode 41*b* is covered with a radio-active positive beta particle emitting material.

The two emitting electrodes are disposed along an X-axis, disposed generally in a horizontal plane.

Each of the two emitting electrodes 41*a* and 41*b* has attached thereto a conducting wire 41*c* and 41*d*, respectively. The two wires exit through an airtight sealed connection through the bottom wall of the vessel.

Two collecting electrodes 42*a* and 42*b* are disposed in the upper part of the vessel along a Y-axis which is oriented in a direction perpendicular to the X-axis in a horizontal plane disposed a suitable distance above aforesaid horizontal plane containing the X-axis.

A stream of negative particles is emitted from the emitter 41*a* and a stream of positive particles is emitted from the emitter 41*b*. Two pairs of reflector plates are provided for steering the two particle streams. These pairs consist of plates 44*a* and 44*d* which operate to steer the positive particle beam, while plates 44*b* and 44*c* serve to steer the negative particle beam. The steering operation is best seen in the top-down diagrammatic view of FIG. 6*a*. In that view each particle beam is shown in one of its two positions by a pair of solid arrows, referenced 46*d* and 46*c* emitting from emitters 41*a* and 41*b*, respectively, and a pair of dashed line arrows, referenced 46*b* and 46*a*, again from emitters 41*a* and 41*b* respectively.

FIG. 6*b* is a vertical elevational view of the invention seen along the line 6*b*—6*b* of FIG. 6*a*.

The operation of the present embodiment of the dual beam switching atomic battery will now be explained in reference to FIGS. 6*a* and 7, where the latter is a schematic circuit diagram of the electrical circuit of the invention. In order to simplify the explanation, the two emitter electrodes 41*a* and 41*b* are both electrically connected to a common neutral potential, designated by the conventional "ground" symbol, and all operating potentials are also referenced to this common ground potential. For the purpose of explanation, it is assumed that the system has been started, either by its own self-starting capability or by starting means that are similar to those explained under the description of the embodiment of FIG. 4, where the starting apparatus is shown in the broken line box designated FIG. 4*a*.

In sustained operation the two oppositely charged beams are switching back and forth between the dashed line and the full line positions at the basic resonant frequency of the resonant circuit consisting of winding 45 and capacitor 46, under control of the two pairs of reflecting plates 44*a*, 44*d*, 44*b* and 44*c*.

The operation of the dual beam switching embodiment may best be explained by reference to the single beam switching embodiment, shown in FIG. 1, disregarding first the positive particle beam. In this case the two reflecting plates 44*b* and 44*c* alternatly drive the negative beam between the two positions indicated by the arrows 46*b* and 46*d*. Since the reflecting plates in this embodiment must always repel the negative particle beam, the plates must always be at some negative potential. For that reason, networks consisting of resistors 54*b* and 54*c* in series with rectifiers 55*b* and 55*c* respectively have been interposed between the terminals of the secondary resonant circuit consisting of winding 49 and capacitor 48. The rectifiers, having high conductance in the forward direction effectively prevent the reflecting plates 44*c* and 44*b* from ever attaining a positive potential. In this manner the system according to the present embodiment would be capable of operating as the one described under FIG. 1. Conversely, disregarding the negative particle beam, and viewing at the moment only the positive particle beam emittent from emitter 41*b*, it is seen that the reflecting plates 44*a* and 44*d* must always be at some potential between ground and the extreme positive potential, but never at negative potential, in order to steer the positive particles alternately to one or the other of the two collecting electrodes 42*a* and 42*b*. For that reason the two rectifiers 55*a* and 55*d* are reversed in relation to rectifiers 55*b* and 55*c* to avoid the reflecting plates 44*a* and 44*d* ever turning negative.

It follows from the foregoing discussion that the mere process of combining the two beams in one envelope in such a way that the two oppositely charged beams never occupy the same space at the same time, since the oppositely charged particles in this case would neutralize each other, leads to the apparatus construction described above of the dual beam switching embodiment of the invention and shown in FIGS. *6a*, *6b* and 7. It further follows that the two beams will reinforce each other and increase the power output and that the total energy output will be the sum of the energy produced by each of the two beams.

FIG. 8*c* shows the electrical potential during operation that would be seen on the terminals of the secondary resonant circuit terminals 52*b* and 52*a* which are 180 degrees($\pi$ in absolute angular measure ) out of phase, as well as the potential on the terminals 42*a* and 42*b* of the primary resonant circuit, which are, similarly, 180 degrees out of phase. The potentials seen on the reflecting plates 44*a* and 44*d* are shown on FIG. 8*b*, and are, as seen, never negative, while the potentials on the reflecting plates 44*b* and 44*c* are seen on FIG. 8*c* and are, as seen, never positive.

OTHER EMBODIMENTS

The dual beam switching embodiment described above may have multiple collecting electrodes that are spatially separated in a manner similar to that shown for the single beam switching embodiment shown in FIG. 2. In this case, the individual collecting electrodes will be connected to impedance matching taps on the primary resonant circuit as also described in connection with FIG. 2.

The dual beam switching embodiment may be provided with a single resonant circuit in a manner shown for the single beam switching circuit in FIG. 5. Also the power take-off winding 53 may be replaced by two taps on the single resonant circuit if the load circuit is capable of operating without the isolation afforded by a separate take-off winding.

In still another embodiment of the invention the physical construction has been made elongated as shown in FIG. 9. In this enclosure the vessel is configured as an elongated prism shown in a perspective cross-sectional view in FIG. 9.

With this latter configuration, the collecting electrodes would be elongated rectangles shown as 62*a* and 62*b*, and similarly the reflecting plates would be elongated shown as 64*a* and 64*b*, and the emitting electrode 61*a* covered with radio-active material 61 would be elongated as well.

The elongated prismatic configuration operates in all respects in a manner similar to the earlier described embodiments, but may under certain circumstances have the advantage of allowing a more suitable packaging arrangement that may fit into spaces otherwise not suitable for other configurations.

In still another embodiment of the invention, said reflecting electrodes consist of electromagnetic reflecting windings disposed with their axes in a generally horizontal line positioned near said neck cavity area of the vessel and generally perpendicular to a vertical plane defined by the centerlines of said branch cavities. Said reflecting windings are electrically coupled to said primary winding so that an alternating magnetic field generated by said windings is traversing said neck cavity, thereby acting to deflect said stream of charged particles in an alternating motion between said collecting electrodes in a manner identical to that of said reflecting electrodes.

We claim:

1. An atomic battery with beam switching comprising in combination:
- a vessel constructed of an airtight, electrically insulating material, having outer walls defining a generally airless inner cavity, said cavity consisting of
- a lower cavity section, said lower cavity section extending upward into at least one pair of upward projecting, upwardly elongated, branch cavity sections, where each pair of said branch cavity sections consists of a first and a second branch cavity section, and where said lower cavity section and said branch cavity sections are connected by
- a neck cavity section,
- said lower cavity section containing at its lower inner surface
- emitter electrode means, further comprising radioactive material emitting electrically charged particles;
- at least one pair of reflecting electrode means;
- a plurality of collecting electrode means;
- control network means, comprising windings and capacitors;
- connecting means interconnecting said control network means with collecting electrode means, and with said reflecting electrode means and with an external load.

2. An atomic battery with beam switching as defined in claim 1, wherein:
- said emitter electrode means consists of at least one generally horizontally oriented planar emitter supporting radio-active material emitting electrically charged particles of one polarity, said particles radiating upward through said neck cavity section.

3. An atomic battery with beam switching as defined in claim 2, wherein:
- said pair of reflecting electrode means are disposed generally in proximity to and outside said neck cavity section, each of said pairs of reflecting electrode means consisting of a first and a second reflecting electrode.

4. An atomic battery with beam switching as defined in claim 3, wherein:
- said plurality of collecting electrode means is equal to the plurality of said branch cavity sections, each collecting electrode means disposed inside one of each of said branch cavity sections, said collecting electrode means consisting of at least one collecting electrode spatially separated and disposed along the axis of said elongated branch cavity section.

5. An atomic battery with beam switching as defined in claim 4, wherein:
- said control network means consists of primary winding means, secondary winding means, and power take-off winding.

6. An atomic battery with beam switching as defined in claim 5, wherein:
- said primary winding means comprises a primary winding and a primary resonating capacitor, in parallel connection with said primary winding;
- said primary winding has a first and a second end;
- said secondary winding means comprises a secondary winding and a secondary resonating capacitor in parallel connection with said second winding; and
- said secondary winding has a first and a second end.

7. An atomic battery with beam switching as defined in claim 6, wherein:

said primary winding, said secondary winding and said power take-off winding are wound on a core of ferro-magnetic material.

8. An atomic battery with beam switching as defined in claim 6, wherein:

said control network means comprising a primary winding, said winding further comprising a plurality of taps, said plurality of taps equal to the plurality of said collecting electrodes.

9. An atomic battery with beam switching as defined in claim 5, wherein said control network means further comprises a self starting arrangement comprising:

a thyristor in series connection between one of said collecting electrodes and one end of said primary winding;

said thyristor in parallel connection with a spark gap;

said thyristor having a control electrode, said control electrode in series connection with a start winding, said winding in series connection with a rectifying diode so that oscillatory energy from said start winding activates said control electrode to trigger said thyristor into its conducting state; and said spark gap in parallel connection with a capacitor, said capacitor being charged to a voltage exceeding the break-down voltage of said spark gap by the electrically charged particles collected by said one collecting electrode, said spark gap at the moment of break-down allowing a transient rush of current to flow in said primary winding, said transient rush of current causing start of the oscillations.

10. An atomic battery with beam switching as defined in claim 4, wherein:

said emitter electrode means comprises a first emitter electrode emitting a beam of negatively charged particles and a second emitter electrode emitting a beam of positively charged particles;

said first and second emitters disposed in a generally horizontal plane near the bottom of said lower cavity section and spatially separated along an X-axis;

said one pair of reflecting electrode means comprises a first pair of two reflecting electrodes, each reflecting electrode operating to reflect said beam of negatively charged particles toward one or the other of said collecting electrode means under control of a rectifier network, said rectifier network operating to insure negative potential on said pair of first reflector electrodes at all times; and a second pair of reflecting electrodes comprising two reflecting electrodes, each reflecting electrode operating to reflect said beam of positively charged particles toward one or the other of said collecting electrodes under control of a rectifier network operating to insure positive potential on said pair of second electrodes at all times;

said pluraltiy of collecting electrode means consists of a first collecting electrode means and a second collecting electrode means, said first and second collecting electrode means disposed in a generally horizontal planar space near the upper part of said branch cavity section, said first and second collecting electrode means spatially separated along a Y-plane said Y-axis perpendicular to said X-axis;

said control network means operating to control said pairs of reflecting electrodes such that said beams of negatively charged particles and said beam of positively charged particles are alternatively directed toward one of said collecting electrode means or the other, and such that aforesaid beams are never directed toward the same collecting electrode means at the same time.

11. An atomic battery with beam switching as defined in claim 10 wherein said control network further comprises a self-starting network comprising:

a thyristor in series connection between one of said collecting electrodes and one end of said primary winding;

said thyristor in parallel connection with a spark gap;

said thyristor having a control electrode, said control electrode in series connection with a start winding, said start winding in series connection with a rectifying diode so that oscillatory energy from said start winding activates said control electrode to trigger said thyristor into its conducting state; and said spark gap in parallel connection with a capacitor, said capacitor being charged to a voltage exceeding the break-down voltage of said spark gap by the electrically charged particles collected by said one collecting electrode, said spark gap, at the moment of break-down, allowing a transient rush of current to flow in said primary winding, said transient rush of current causing start of the oscillations.

* * * * *